US012328766B2

(12) United States Patent
Farag et al.

(10) Patent No.: US 12,328,766 B2
(45) Date of Patent: Jun. 10, 2025

(54) STRUCTURE OF MESSAGE FROM USER EQUIPMENT TO BASE STATION IN TWO-STEP RANDOM ACCESS

(71) Applicant: Nokia Technologies Oy, Espoo (FI)

(72) Inventors: Emad Farag, Flanders, NJ (US); Frank Frederiksen, Klarup (DK); Nuno Manuel Kiilerich Pratas, Gistrup (DK)

(73) Assignee: Nokia Technologies Oy, Espoo (FI)

( * ) Notice: Subject to any disclaimer, the term of this patent is extended or adjusted under 35 U.S.C. 154(b) by 615 days.

(21) Appl. No.: 17/422,849

(22) PCT Filed: Feb. 11, 2020

(86) PCT No.: PCT/FI2020/050083
§ 371 (c)(1),
(2) Date: Jul. 14, 2021

(87) PCT Pub. No.: WO2020/165498
PCT Pub. Date: Aug. 20, 2020

(65) Prior Publication Data
US 2022/0124816 A1    Apr. 21, 2022

Related U.S. Application Data

(60) Provisional application No. 62/825,500, filed on Mar. 28, 2019, provisional application No. 62/806,389, filed on Feb. 15, 2019.

(51) Int. Cl.
*H04W 52/36*    (2009.01)
*H04L 5/00*     (2006.01)
(Continued)

(52) U.S. Cl.
CPC ....... *H04W 74/0833* (2013.01); *H04L 5/0051* (2013.01); *H04W 52/36* (2013.01);
(Continued)

(58) Field of Classification Search
CPC ........ H04W 74/0836; H04W 74/0833; H04W 52/36; H04W 72/04; H04W 72/1268;
(Continued)

(56) References Cited

U.S. PATENT DOCUMENTS 11,259,331 B2    2/2022  Jeon et al.
11,647,543 B2    5/2023  Dinan et al.
(Continued)

FOREIGN PATENT DOCUMENTS

CN    101123795 A    2/2008
CN    108282897 A    7/2018
(Continued)

OTHER PUBLICATIONS

Office Action received for corresponding Indian Patent Application No. 202147038102, dated Mar. 21, 2022, 9 Pages.
(Continued)

*Primary Examiner* — Michael Y Mapa
(74) *Attorney, Agent, or Firm* — Brake Hughes Bellermann LLP

(57) ABSTRACT

A technique of performing a RACK procedure includes a framework for a two-step RACK in which a first message (MsgA) from the UE to the gNB has data carrying resources (i.e., PUSCH) is organized into a time-frequency array defined by a mapping to a plurality of preambles. Such a two-step RACK has less latency than the four-step RACK due to fewer signaling exchanges. Moreover, this two-step RACK also causes the UE to use less power due to a decreased signaling overhead.

15 Claims, 14 Drawing Sheets

(51) Int. Cl.
*H04W 72/04* (2023.01)
*H04W 72/1268* (2023.01)
*H04W 74/0833* (2024.01)
*H04W 74/0836* (2024.01)

(52) U.S. Cl.
CPC ....... *H04W 72/04* (2013.01); *H04W 72/1268* (2013.01); *H04W 74/0836* (2024.01)

(58) Field of Classification Search
CPC ............ H04W 74/006; H04W 74/0838; H04L 5/0051; H04L 5/0044; H04L 5/0007; H04L 27/261
USPC ............ 370/329; 455/434, 515, 435.1–435.3
See application file for complete search history.

(56) References Cited

U.S. PATENT DOCUMENTS

| | | | |
|---|---|---|---|
| 12,048,017 | B2 | 7/2024 | Farag et al. |
| 2018/0103465 | A1 | 4/2018 | Agiwal et al. |
| 2018/0110074 | A1 | 4/2018 | Akkarakaran et al. |
| 2018/0124822 | A1 | 5/2018 | Wang et al. |
| 2018/0198646 | A1 | 7/2018 | Gau et al. |
| 2018/0205516 | A1 | 7/2018 | Jung et al. |
| 2018/0220450 | A1 | 8/2018 | Aiba et al. |
| 2018/0279376 | A1 | 9/2018 | Dinan et al. |
| 2018/0376495 | A1* | 12/2018 | Lee .................... H04W 72/04 |
| 2019/0313457 | A1* | 10/2019 | Tsai .................... H04L 5/0048 |
| 2020/0120713 | A1 | 4/2020 | Yerramalli et al. |
| 2020/0229241 | A1* | 7/2020 | Jeon ................. H04W 74/0833 |
| 2020/0252974 | A1 | 8/2020 | Akkarakaran et al. |
| 2020/0260498 | A1 | 8/2020 | Xu et al. |
| 2020/0267772 | A1 | 8/2020 | Jung et al. |
| 2020/0267774 | A1* | 8/2020 | Vos .................. H04W 74/0833 |
| 2021/0219348 | A1 | 7/2021 | Zhang |
| 2021/0378024 | A1 | 12/2021 | Cao et al. |
| 2021/0392693 | A1* | 12/2021 | Kanno .................. H04W 72/02 |
| 2022/0132588 | A1 | 4/2022 | Loehr et al. |
| 2023/0209610 | A1 | 6/2023 | Chen et al. |
| 2025/0056626 | A1 | 2/2025 | Huang et al. |

FOREIGN PATENT DOCUMENTS

| | | |
|---|---|---|
| CN | 108293262 A | 7/2018 |
| CN | 109168147 A | 1/2019 |
| EP | 3864923 A1 | 8/2021 |
| EP | 3927063 A1 | 12/2021 |
| EP | 3927093 A1 | 12/2021 |
| TW | 201817272 A | 5/2018 |
| WO | 2017/023066 A1 | 2/2017 |
| WO | 2018/049274 A1 | 3/2018 |
| WO | 2018/085205 A1 | 5/2018 |
| WO | 2018/127042 A1 | 7/2018 |
| WO | 2018/127226 A1 | 7/2018 |
| WO | 2018/175809 A1 | 9/2018 |
| WO | 2018/231003 A1 | 12/2018 |
| WO | 2018/232003 A1 | 12/2018 |
| WO | 2020077115 A1 | 4/2020 |
| WO | 2020088652 A1 | 5/2020 |

OTHER PUBLICATIONS

Tentative Rejection received for corresponding Taiwan Patent Application No. 109104793, dated Jun. 12, 2023, 3 pages of Tentative Rejection and no page of translation available.
Office Action received for corresponding Vietnam Patent Application No. 1-2021-05567, dated Aug. 16, 2023, 2 pages of Office Action and 2 pages of translation available.
Extended European Search Report received for corresponding European Patent Application No. 20756211.7, dated Aug. 5, 2022, 11 pages.
"New Radio (NR) Access Technology", 3GPP TSG RAN meeting #77, RP-171783, Agenda: 9.2.1, NTT Docomo Inc, Sep. 11-14, 2017, pp. 1-284.
Office Action received for corresponding Canadian Patent Application No. 3128860, dated Oct. 12, 2022, 4 pages.
Extended European Search Report received for corresponding European Patent Application No. 20755692.9, dated Oct. 13, 2022, 12 pages.
"2-Step RACH Procedure for NTN", 3GPP TSG RAN WG2 Meeting #105, R2-1901474, Agenda: 11.6.3.1, Nomor Research GmbH, Feb. 25-Mar. 1, 2019, 3 pages.
"Report of Email Discussion [103#55][NR-U] 2-step RACH Model and Initial Information Contents (Qualcomm)", 3GPP TSG-RAN WG2 Meeting #103bis, R2-1815564, Agenda: 11.2.1.1, Qualcomm Incorporated, Oct. 8-12, 2018, 17 pages.
Office Action received for corresponding Argentina Patent Application No. 20200100419, dated Sep. 18, 2023, 5 pages of Office Action and no page of translation available.
"3rd Generation Partnership Project; Technical Specification Group Radio Access Network; NR; Physical layer procedures for control (Release 16)", 3GPP TS 38.213, V16.0.0, Dec. 2019, pp. 1-146.
"3rd Generation Partnership Project; Technical Specification Group Radio Access Network; NR; Medium Access Control (MAC) protocol specification (Release 16)", 3GPP TS 38.321, V16.2.1, Sep. 2020, pp. 1-154.
Non-Final Office action received for corresponding U.S. Appl. No. 17/422,941, dated Oct. 23, 2023, 10 pages.
"New work item: 2-step RACH for NR", 3GPP TSG RAN Meeting #82, RP-182894, Agenda: 9.1.1, ZTE Corporation, Dec. 10-13, 2018, 5 pages.
"2-step Random Access Procedure", 3GPP TSG RAN WG1 AH_NR Meeting, R1-1700105, Agenda: 5.1.1.4.3, ZTE, Jan. 16-20, 2017, 9 pages.
"Further considerations on a 2-step RA Procedure", 3GPP TSG RAN WG1 AH_NR Meeting, R1-1700186, Agenda: 5.1.1.4.3, CATT, Jan. 16-20, 2017, 4 pages.
"2-step Random Access Procedure", 3GPP TSG RAN WG1 AH_NR Meeting, R1-1700703, Agenda: 5.1.1.4.3, InterDigital Communications, Jan. 16-20, 2017, pp. 1-4.
"NR 2-step Random Access Procedure", 3GPP TSG RAN WG1 NR Ad Hoc, R1-1700892, Agenda: 5.1.1.4.3, Samsung, Jan. 16-20, 2017, 5 pages.
International Search Report and Written Opinion received for corresponding Patent Cooperation Treaty Application No. PCT/FI2020/050083, dated May 19, 2020, 14 pages.
"Considerations on NR V2X scheduling mechanism", 3GPP TSG RAN WG1 Ad-Hoc Meeting 1901, R1-1900745, Agenda: 7.2.4.1.5, Apple, Jan. 21-25, 2019, pp. 1-5.
International Search Report and Written Opinion received for corresponding Patent Cooperation Treaty Application No. PCT/FI2020/050084, dated Jun. 15, 2020, 15 pages.
"Enhancements to initial access and mobility for NR-unlicensed", 3GPP TSG RAN WG1 Meeting #94, R1-1808686, Agenda: 7.2.2.4.2, Intel Corporation, Aug. 20-24, 2018, 4 pages.
"NR 4-step RACH procedure", 3GPP TSG-RAN WG1#89, R1-1708244, Agenda: 7.1.1.4.2, Nokia, May 15-19, 2017, 12 pages.
Tentative Rejection received for corresponding Taiwan Patent Application No. 109104793, dated Dec. 11, 2020, 8 pages of Tentative Rejection and 1 page of translation available.
Office action received for corresponding Bangladesh Patent Application No. 47/2020, dated Mar. 3, 2021, 1 page.
Office Action received for corresponding Taiwan Patent Application No. 109104793, dated Jun. 30, 2021, 4 pages of Office Action and no page of translation available.
Office Action received for corresponding Vietnam Patent Application No. 1-2021-05567, dated Oct. 15, 2021, 1 page of Office Action and 1 page of translation available.
Office action received for corresponding European Patent Application No. 20755692.9, dated Dec. 21, 2023, 7 pages.
Office action received for corresponding Chinese Patent Application No. 202080014824.8, dated Dec. 25, 2023, 10 pages of office action and no page of translation available.
Office action received for corresponding Chinese Patent Application No. 202080014757.X, dated Dec. 26, 2023, 9 pages of office action and no page of translation available.

(56) References Cited

OTHER PUBLICATIONS

"Considerations on NR V2X scheduling mechanism", 3GPP TSG RAN WG1 #96, R1-1902763, Agenda: 7.2.4.1.5, Apple, Feb. 25-Mar. 1, 2019, pp. 1-5.
Office Action received for corresponding Argentina Patent Application No. 20200100419, dated Jan. 31, 2024, 8 pages of Office Action (including machine translation).
Second Office Action for Chinese Patent Application No. 202080014757.X, mailed on Jun. 7, 2024, 14 pages.
Second Office Action for Chinese Patent Application No. 202080014824.8, mailed on Jun. 7, 2024, 18 pages.
Office Action for Vietnam Patent Application No. 1-2021-05567, mailed on Sep. 20, 2024, 3 pages.
Communication pursuant to Article 94(3) EPC for European Patent Application No. 20756211.7, mailed on Mar. 20, 2025, 9 pages.

* cited by examiner

| i | j | k | i | j | k | i | j | k | i | j | k |
|---|---|---|---|---|---|---|---|---|---|---|---|
| 0 | 0 | 0 | 16 | 0 | 2 | 32 | 0 | 4 | 48 | 1 | 2 |
| 1 | 0 | 0 | 17 | 0 | 2 | 33 | 0 | 4 | 49 | 1 | 2 |
| 2 | 0 | 0 | 18 | 0 | 2 | 34 | 1 | 0 | 50 | 1 | 2 |
| 3 | 0 | 0 | 19 | 0 | 2 | 35 | 1 | 0 | 51 | 1 | 2 |
| 4 | 0 | 0 | 20 | 0 | 2 | 36 | 1 | 0 | 52 | 1 | 3 |
| 5 | 0 | 0 | 21 | 0 | 3 | 37 | 1 | 0 | 53 | 1 | 3 |
| 6 | 0 | 0 | 22 | 0 | 3 | 38 | 1 | 0 | 54 | 1 | 3 |
| 7 | 0 | 1 | 23 | 0 | 3 | 39 | 1 | 0 | 55 | 1 | 3 |
| 8 | 0 | 1 | 24 | 0 | 3 | 40 | 1 | 1 | 56 | 1 | 3 |
| 9 | 0 | 1 | 25 | 0 | 3 | 41 | 1 | 1 | 57 | 1 | 3 |
| 10 | 0 | 1 | 26 | 0 | 3 | 42 | 1 | 1 | 58 | 1 | 4 |
| 11 | 0 | 1 | 27 | 0 | 3 | 43 | 1 | 1 | 59 | 1 | 4 |
| 12 | 0 | 1 | 28 | 0 | 4 | 44 | 1 | 1 | 60 | 1 | 4 |
| 13 | 0 | 1 | 29 | 0 | 4 | 45 | 1 | 1 | 61 | 1 | 4 |
| 14 | 0 | 2 | 30 | 0 | 4 | 46 | 1 | 2 | 62 | 1 | 4 |
| 15 | 0 | 2 | 31 | 0 | 4 | 47 | 1 | 2 | 63 | 1 | 4 |

STRUCTURE OF MESSAGE FROM USER EQUIPMENT TO BASE STATION IN TWO-STEP RANDOM ACCESS

RELATED APPLICATION

This application was originally filed as PCT Application No. PCT/FI2020/050083 on Feb. 11, 2020, which claims priority from U.S. Provisional Application No. 62/806,389, filed on Feb. 15, 2019 and from U.S. Provisional Application No. 62/825,500, filed on Mar. 28, 2019, which is hereby incorporated in its entirety.

TECHNICAL FIELD

This description relates to communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's LTE upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments.

A global bandwidth shortage facing wireless carriers has motivated the consideration of the underutilized millimeter wave (mmWave) frequency spectrum for future broadband cellular communication networks, for example. mmWave (or extremely high frequency) may, for example, include the frequency range between 30 and 300 gigahertz (GHz). Radio waves in this band may, for example, have wavelengths from ten to one millimeters, giving it the name millimeter band or millimeter wave. The amount of wireless data will likely significantly increase in the coming years. Various techniques have been used in attempt to address this challenge including obtaining more spectrum, having smaller cell sizes, and using improved technologies enabling more bits/s/Hz. One element that may be used to obtain more spectrum is to move to higher frequencies, e.g., above 6 GHz. For fifth generation wireless systems (5G), an access architecture for deployment of cellular radio equipment employing mmWave radio spectrum has been proposed. Other example spectrums may also be used, such as cmWave radio spectrum (e.g., 3-30 GHz).

SUMMARY

According to an example implementation, a method includes receiving, by a user equipment (UE), information from a network, the information including (i) a plurality of preambles to be transmitted over a physical random access channel (PRACH) and (ii) locations and size and DMRS ports of physical uplink shared channel (PUSCH) resources in time and frequency space by which data is to be transmitted to a base station (gNB); and (iii) mapping information between the preambles and PUSCH resources; after receiving the information, performing, by the UE, a preamble selection operation to produce a selected preamble of the plurality of preambles; and performing, by the UE, a PUSCH determination operation to produce a location and size of a PUSCH resource in the time and frequency space and the DMRS port of the PUSCH resource, the location and the size of the PUSCH resource and the DMRS port of the PUSCH resource being based on the selected preamble and/or the amount of PUSCH resource elements needed to transmit the payload from the UE.

According to an example implementation, an apparatus includes at least memory and controlling circuitry coupled to the memory, the controlling circuitry being configured to receive information from a network, the information including (i) a plurality of preambles to be transmitted over a physical random access channel (PRACH) and (ii) locations and size and DMRS ports of physical uplink shared channel (PUSCH) resources in time and frequency space by which data is to be transmitted to a base station (gNB); and (iii) mapping information between the preambles and PUSCH resources; after receiving the information, perform a preamble selection operation to produce a selected preamble of the plurality of preambles; and perform a PUSCH determination operation to produce a location and size of a PUSCH resource in the time and frequency space and the DMRS port of the PUSCH resource, the location and the size of the PUSCH resource and the DMRS port of the PUSCH resource being based on the selected preamble.

According to an example implementation, an apparatus includes means for receiving information from a network, the information including (i) a plurality of preambles to be transmitted over a physical random access channel (PRACH) and (ii) locations and size and DMRS ports of physical uplink shared channel (PUSCH) resources in time and frequency space by which data is to be transmitted to a base station (gNB); and (iii) mapping information between the preambles and PUSCH resources; means for, after receiving the information, performing a preamble selection operation to produce a selected preamble of the plurality of preambles; and means for performing a PUSCH determination operation to produce a location and size of a PUSCH resource in the time and frequency space and the DMRS port of the PUSCH resource, the location and size of the PUSCH resource and the DMRS port being based on the selected preamble.

According to an example implementation, a computer program product includes a computer-readable storage medium and storing executable code that, when executed by at least one data processing apparatus, is configured to cause the at least one data processing apparatus to receive information from a network, the information including (i) a plurality of preambles to be transmitted over a physical random access channel (PRACH) and (ii) locations and size and DMRS ports of physical uplink shared channel (PUSCH) resources in time and frequency space by which data is to be transmitted to a base station (gNB); and (iii) mapping information between the preambles and PUSCH resources; after receiving the information, perform a preamble selection operation to produce a selected preamble of the plurality of preambles; and perform a PUSCH determination operation to produce a location and size of a PUSCH resource in the time and frequency space and the DMRS port of the PUSCH resource, the location and size of the PUSCH resource and the DMRS port of the PUSCH resource being based on the selected preamble.

The details of one or more examples of implementations are set forth in the accompanying drawings and the description below. Other features will be apparent from the description and drawings, and from the claims.

BRIEF DESCRIPTION OF THE DRAWINGS

FIG. 5 is a table illustrating an allocation of preamble index "i" to time "l" frequency "k" resources according to an example implementation.

DETAILED DESCRIPTION

Figure 1A:
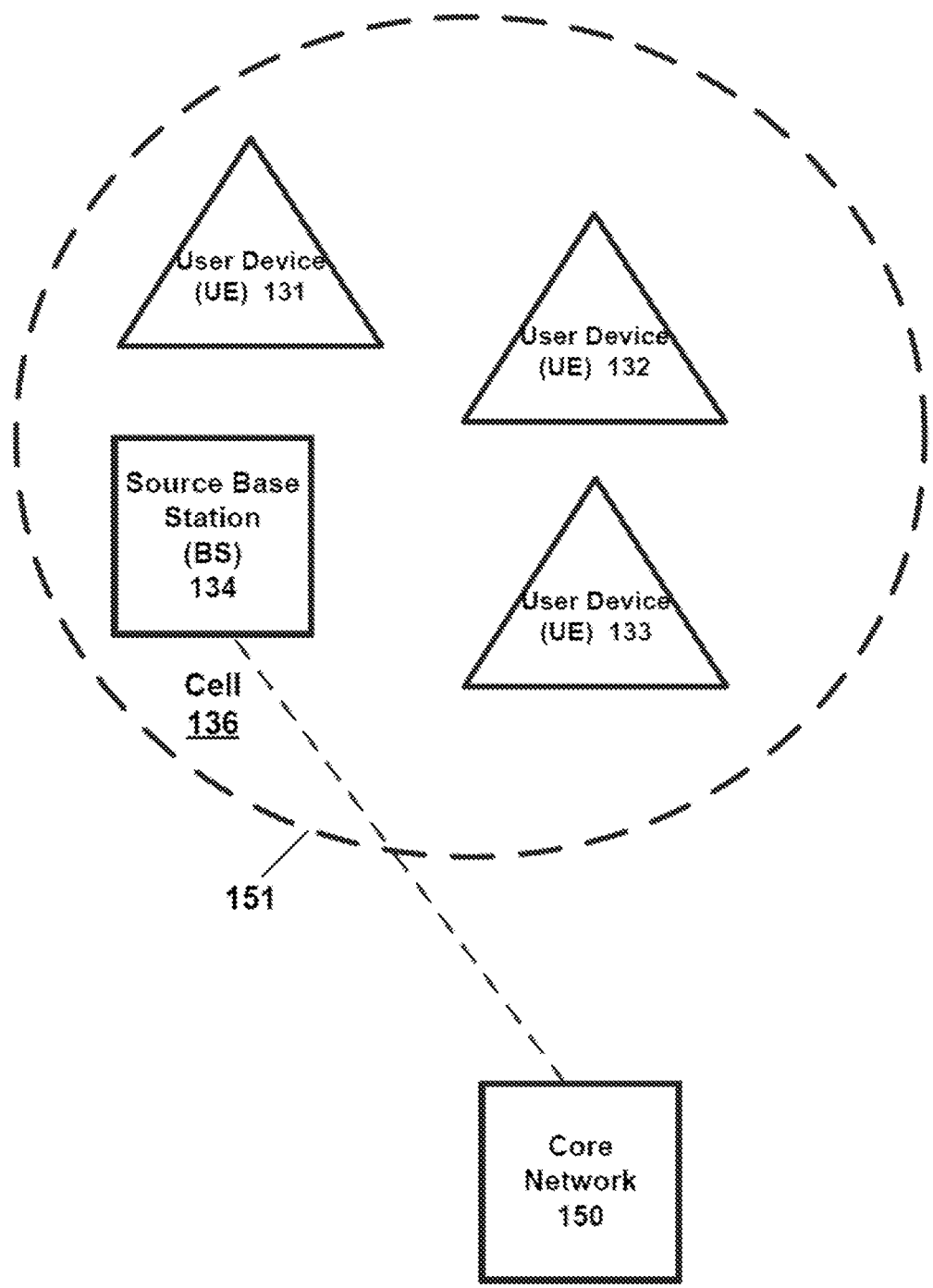
FIG. 1A is a block diagram of a wireless network according to an example implementation.

FIG. 1A is a block diagram of a wireless network 130 according to an example implementation. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a gNB (which may be a 5G base station) or a network node. At least part of the functionalities of an access point (AP), base station (BS) or (e)Node B (eNB) may be also be carried out by any node, server or host which may be operably coupled to a transceiver, such as a remote radio head. BS (or AP) 134 provides wireless coverage within a cell 136, including to user devices 131, 132, and 133. Although only three user devices are shown as being connected or attached to BS 134, any number of user devices may be provided. BS 134 is also connected to a core network 150 via an interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

The various example implementations may be applied to a wide variety of wireless technologies, wireless networks, such as LTE, LTE-A, 5G (New Radio, or NR), cmWave, and/or mmWave band networks, or any other wireless network or use case. LTE, 5G, cmWave and mmWave band networks are provided only as illustrative examples, and the various example implementations may be applied to any wireless technology/wireless network. The various example implementations may also be applied to a variety of different applications, services or use cases, such as, for example, ultra-reliability low latency communications (URLLC), Internet of Things (IoT), enhanced mobile broadband, massive machine type communications (MMTC), vehicle-to-vehicle (V2V), vehicle-to-device, etc. Each of these use cases, or types of UEs, may have its own set of requirements.

Figure 1B:
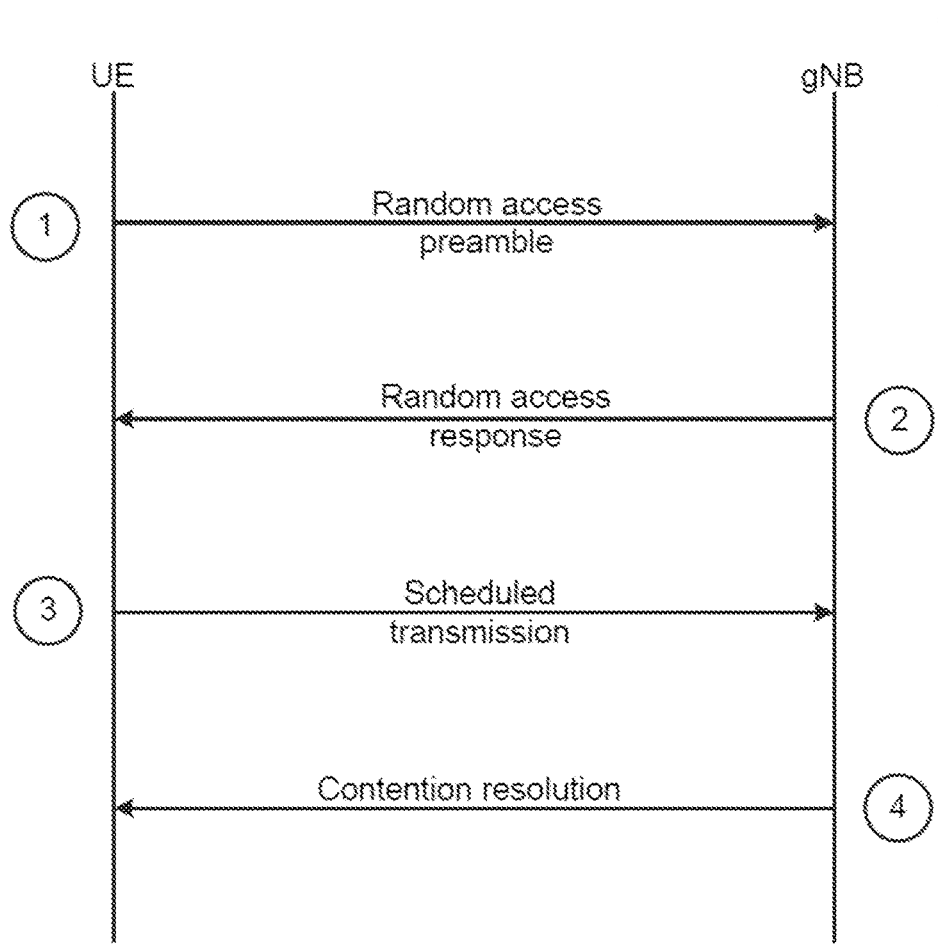
FIG. 1B is a diagram illustrating a four-step contention-based random access (RACH) procedure according to an example implementation.

FIG. 1B is a diagram illustrating an example illustrating a four-step contention-based random access (RACH) procedure 100 according to an example implementation. Each of the steps involves the transmission of a message ("Msg1," "Msg2," "Msg3," "Msg4") between a UE and a gNB. As shown in FIG. 1B, Msg1 includes a preamble (physical RACH, or PRACH) sent from the UE to the gNB to initiate access to the cell associated with the gNB. Msg2 includes a random access response (RAR) sent from the gNB to the UE which instructs the UE to transmit data according to a schedule. In some implementations, Msg2 also includes a time advance command. Msg3 includes the payload (data) transmitted from the UE to the gNB according to the schedule. Msg4 is a contention resolution message. If Msg4 includes the contention resolution identifier expected by the UE, then the RACH procedure has been successfully completed. If Msg4 includes a contention resolution identifier different from that expected by the UE, then the RACH procedure has not been successfully completed.

The above-described four-step RACH has some latency, and increased signaling overhead due to the multiple signaling exchanges. One solution to such latency and increased signaling overhead is a two-step RACH procedure. Such a procedure is discussed with regard to FIG. 1C.

Figure 1C:
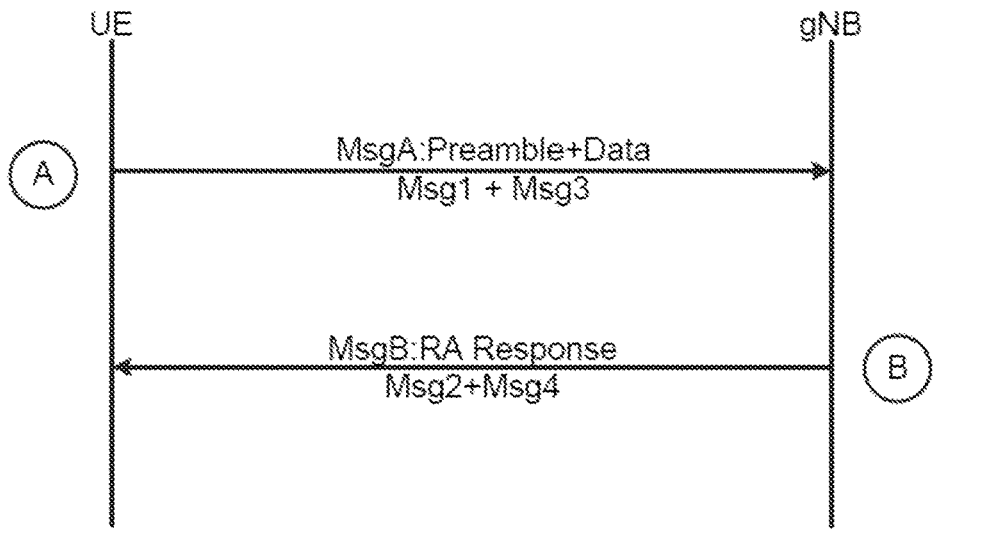
FIG. 1C is a diagram illustrating a two-step RACH procedure according to an example implementation.

FIG. 1C is a diagram illustrating a two-step RACH procedure 110 according to an example implementation. In the two-step RACH procedure 110 illustrated in FIG. 1C, MsgA combines the preamble signal (Msg1) and the data signal (Msg3), and MsgB combines the random access response (Msg2) and the contention resolution (Msg4).

Nevertheless, there are no detailed proposals for the structure of the UE-to-gNB message of two-step RACH. For example, it has been proposed that the PRACH preamble and PUSCH in MsgA be time-division multiplexed (TDMed). An example implementation has a PRACH occasion followed by a PUSCH allocation for the data part of MsgA. This, however, leads to all data of all the preambles being mapped onto the same PSUCH allocation and increases the probability of data collision and false decoding.

In contrast to the above-described conventional RACH procedures, an improved technique includes a framework for a two-step RACH in which a first message (MsgA) from the UE to the gNB has data carrying resources (i.e., two-step RACH PUSCH resource units) is organized into a time-frequency array defined by a mapping to a plurality of preambles. Such a two-step RACH has less latency than the four-step RACH due to fewer signaling exchanges. Moreover, this two-step RACH also causes the UE to use less power due to a decreased signaling overhead.

Figure 2:
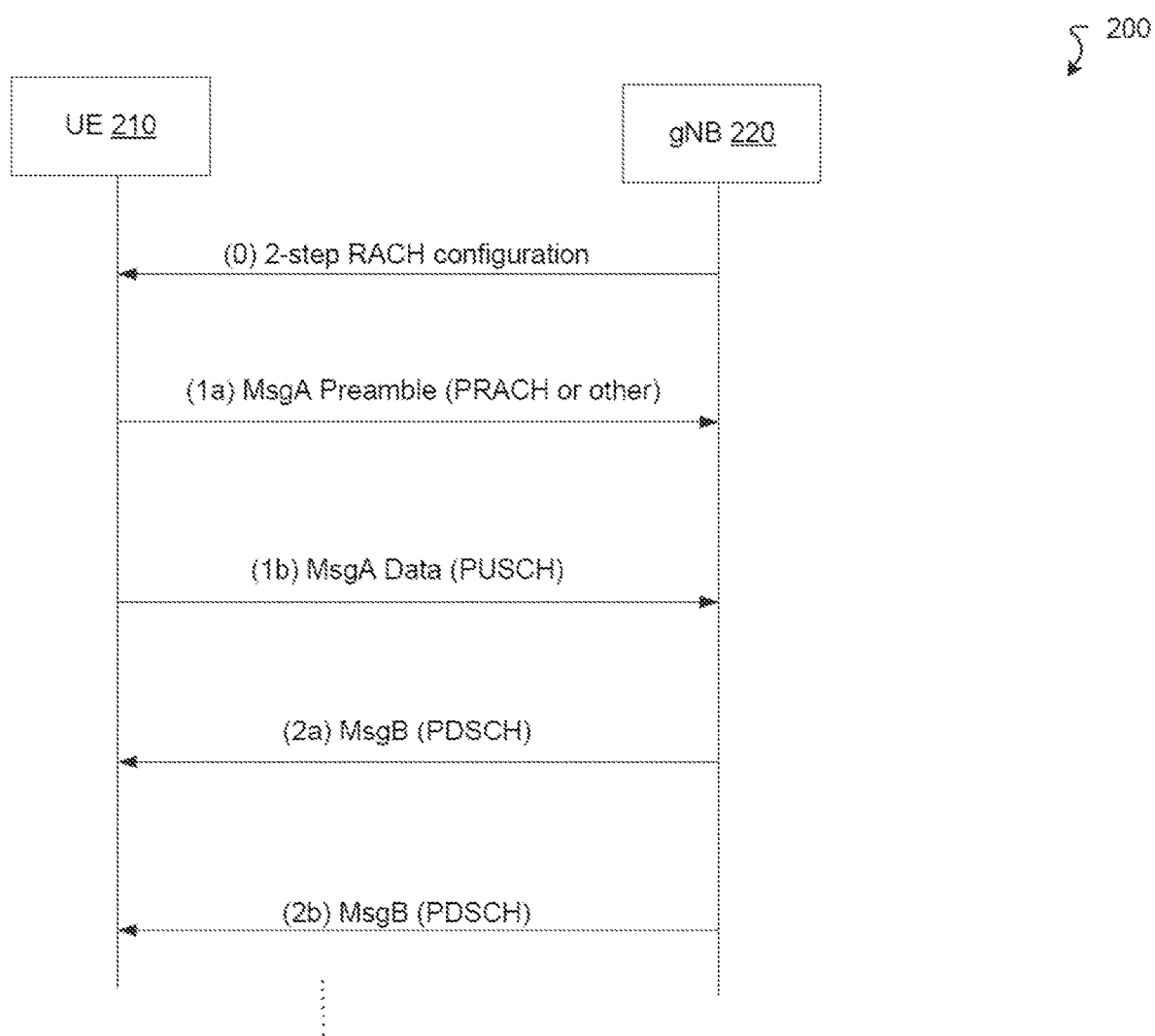
FIG. 2 is a diagram illustrating a two-step RACH procedure with fallback according to an example implementation.

FIG. 2 is a diagram illustrating a two-step RACH procedure 200 with fallback according to an example implementation. As shown in FIG. 2, however, there is a preliminary step 0, which involves a broadcast signal from the gNB. The network broadcasts a two-step RACH configuration in the remaining minimum system information (RMSI), system information block 1 (SIB1), as the two-step RACH can be an initial access scheme. The two-step RACH configuration includes a set of preambles and a mapping between the preambles and a schedule by which a UE 210 may send data to a gNB 220. Further details about the mapping are described with regard to FIGS. 3-5.

As shown in FIG. 2, the MsgA generation and transmission by the UE 210 is divided into two pieces, 1a in which the preamble is selected, and 1b in which a physical resource for sending data is selected.

In 1a, in some implementations, the preamble is a Zadoff-Chu (ZC) sequence and is transmitted over the PRACH (e.g. the two-step procedure preambles are a subset of the available PRACH preambles or there are random access opportunities (PRACH occasions) fully dedicated to the two-step procedure). In some implementations, the preamble has another structure other than the one used in the PRACH, but that is used both for activity detection (for the gNB 220 to detect that a transmission is occurring), timing estimation and as a reference symbol for the data transmission (for the gNB 220 to estimate the channel so that it can decode the data part of MsgA).

In 1b, the UE 210 selects a physical uplink shared channel (PUSCH) resource according with the configuration broadcast by the network in step 0 and according with the UE's 210 own payload requirements. Further details with regard to 1b are described in detail with regard to FIGS. 6-10.

In 2a, the gNB 220, upon successfully decoding the Msg A, transmits a MsgB in order to acknowledge MsgA reception, perform contention resolution and potentially provide any other information that is associated with the request in Msg A. In 2b, the gNB 220 detects the preamble of MsgA, but does not successfully decode the data payload of MsgA. In this case, a Msg2 (see FIG. 1B) is transmitted instead that directs the UE 210 towards a fall back four-step procedure.

Figure 3:
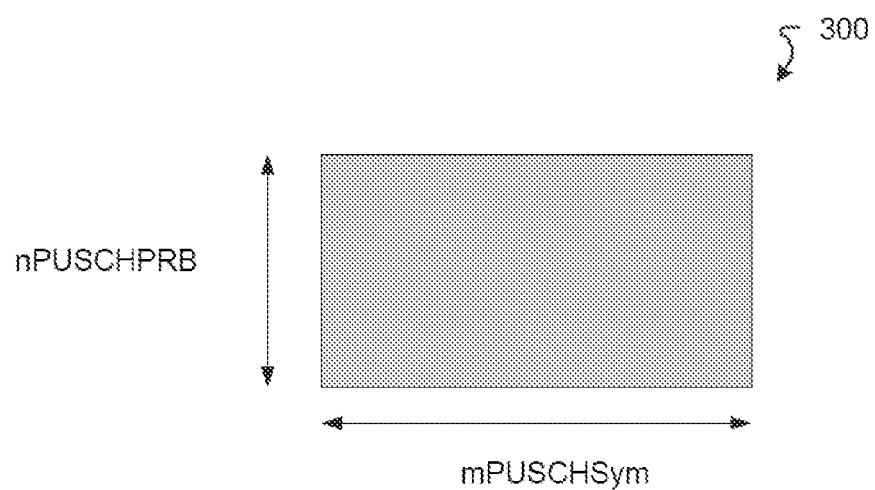
FIG. 3 is a diagram illustrating a data part of a MsgA (i.e., a message from the UE to the gNB) according to an example implementation.

FIG. 3 is a diagram illustrating a data part 300 of a MsgA (i.e., a message from the UE 210 to the gNB 220) according to an example implementation. In some implementations, as described herein, the preamble is transmitted in a PRACH Occasion (RO). In some implementations, another approach for the preamble construction is followed. In some implementations, a RO can be dedicated for a two-step RACH. In some implementations, the RO is shared with two-step RACH.

In the configuration sent by the gNB 220 in step 0, there are MAXPreambleIndex preambles for two-step RACH. In some implementations, MAXPreambleIndex is the number of preambles in one RO. In some implementations, MAXPreambleIndex is the number of preambles in multiple ROs. In some implementations, MAXPreambleIndex is the number of preambles in a portion of a RO. Each of the MAXPreambleIndex preambles of the configuration may be represented by a respective preamble index i. Signal representing the preamble index i is transmitted by the gNB 220 in a RO, where $0 \leq i < \text{MAXPreambleIndex}$. As is discussed with regard to step 1b, the preamble index i determines the time, frequency and DMRS port of the PUSCH resources used for data transmission.

In a time-frequency grid in time and frequency space, multiple resources can be used for data transmission according to the preamble index. Each two-step RACH PUSCH resource unit in the time-frequency grid has a time duration of mPUSCHSym, and an extent in the frequency domain of nPUSCHPRB as shown in FIG. 3. The symbol duration and PRB size is given by numerology of the PUSCH used for data transmission.

Figure 4:
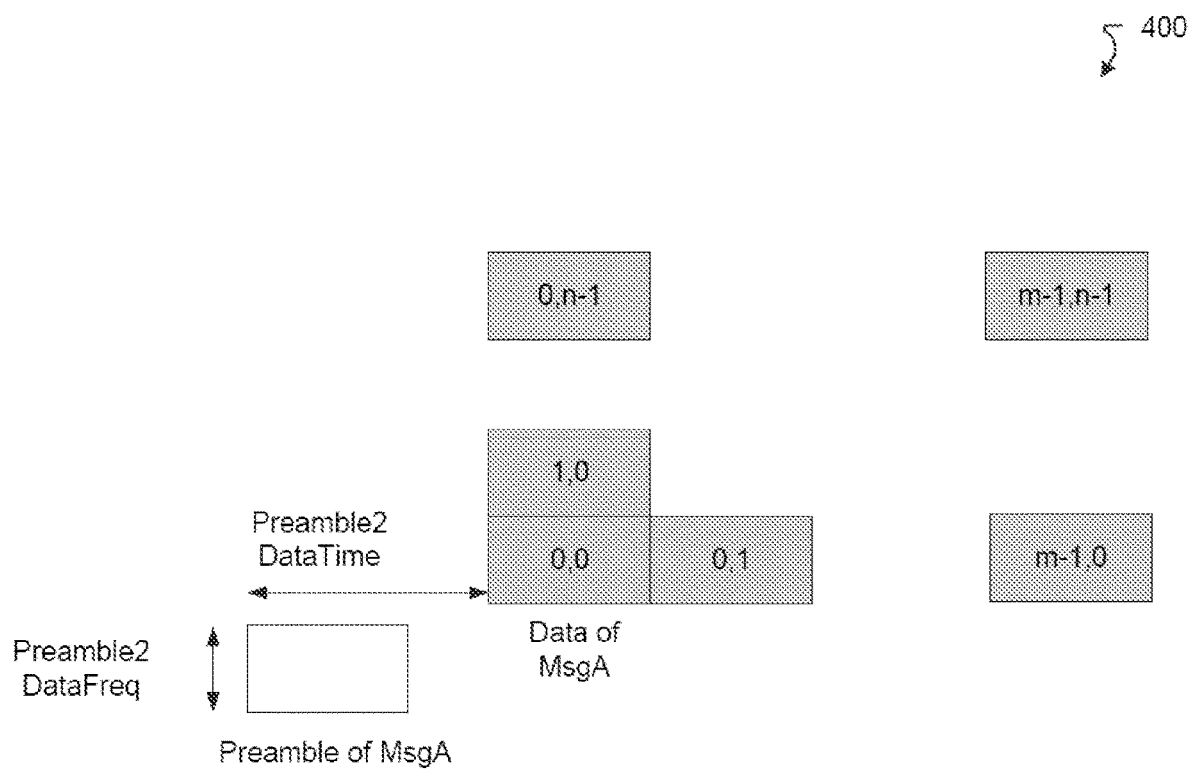
FIG. 4 is a diagram illustrating a structure of the MsgA according to an example implementation.

FIG. 4 is a diagram illustrating a structure 400 of the MsgA according to an example implementation. Consisting of PRACH occasion (it is also possible to have multiple PRACH occasions) and a two-step RACH PUSCH resource group consisting of and array of two-step RACH PUSCH resource units.

As shown in FIG. 4, The MsgA PUSCH frequency resource $k_{PUSCH} \in \{0, 1, \ldots, n-1\}$, where n is the number of frequency-division multiplexed (FDMed) two-step RACH PUSCH resource units for data transmission corresponding to one (or more) preamble RO. The MsgA PUSCH time resource $I_{PUSCH} \in \{0, 1, \ldots m-1\}$, where m is the number of TDMed two-step RACH PUSCH resource units for data transmission corresponding to one (or more) preamble RO. The two-step RACH PUSCH resource units are consecutive in frequency, in time the two-step RACH PUSCH resource units can be consecutive, or can have a gap to accommodate a round-trip delay larger than the cyclic prefix (CP) and avoid interfering with the subsequent transmission. In the structure 400, the earliest PUSCH resource at the lowest frequency starts Preamble2DataTime symbols/slots from the start of the RO used for preamble transmission in the time domain, This PUSCH resource also starts Preamble2DataFreq physical resource blocks (PRBs) from the start of the RO used for preamble transmission in the frequency domain. Preamble2DataTime and Preamble2DataFreq are given by numerology of the PUSCH used for data transmission. Alternatively, the time and frequency of the two-step RACH resource group can be configured with an absolute time that repeats periodically and an absolute frequency within the carrier and/or bandwidth part.

The allocation of PUSH time and frequency resources to the $i^{th}$ preamble is performed as follows. Let A=MAXPreambleIndex mod(m·n), B=⌈MAXPreambleIndex/(m·n)⌉, and C=⌊MAXPreambleIndex/(m·n)⌋. Further define $$a = \begin{cases} \left\lfloor \dfrac{i}{B} \right\rfloor, & i < A \cdot B \\ \left\lfloor \dfrac{i-A}{C} \right\rfloor & i \geq A \cdot B \end{cases}.$$

Then the time domain resource index is $$l_{PUSCH} \equiv \left\lfloor \dfrac{a}{n} \right\rfloor,$$

and the frequency domain resource index is $k_{PUSCH}$=a mod n.

FIG. 5 illustrates a table 500 illustrating an allocation of preamble index "i" to time "1" frequency "k" resources according to an example implementation. As illustrated in FIG. 5, the table is generated using the following values: MAXPreambleIndex=64, m=2, n=5.

As can be seen in FIG. 5, there may be more than one preamble that is mapped to a PUSCH time and frequency resource. Each such preamble for a particular PUSCH time and frequency resource may be assigned to a demodulation reference signal (DMRS) port of the PUSCH time and frequency resource as follows.

Let there be nPreamble values are allocated to a PUSCH time and frequency resource such the logical preamble index allocated to that PUSCH resource is given by h∈{0,1, . . . nPreamble−1}. Moreover, let the PUSCH time and frequency resource have nDMRSPorts DMRS ports, where the DMRS port index j∈{0,1, . . . nDMRSPorts−1}. Then the preamble index h is allocated to the DMRS port index j as follows. Let D=nPreamble mod nDMRSPorts, E=⌈nPreamble/nDMRSPorts⌉, and F=⌊nPreamble/nDMRSPorts⌋. Then $$j = \begin{cases} \left\lfloor \dfrac{h}{E} \right\rfloor, & \text{if } i < D \cdot E \\ \left\lfloor \dfrac{h-D}{F} \right\rfloor & \text{Otherwise} \end{cases}.$$

The proposed mappings of preamble indices to PUSCH resources and DMRS ports (including other mappings following the same principles) as well as the RO dedicated for the two-step are shared with the UE at step 0 via that broadcasted RMSI (SIB1).

Now that the mapping of a preamble to a PUSCH time and frequency resource has been defined, the PUSCH resource selection based on the UE payload is described herein. Note that there are multiple trigger causes for two-step RACH. Each trigger can have a different size for MsgA. Even for the same trigger, MsgA can have different size for different scenarios. Different MsgA configurations may have different number of PRBs nPUSCHPRB and number of OFDM symbols nPUSCHSym. Accordingly, there are different approaches to selecting a PUSCH resource; such approaches are discussed with regard to FIGS. 6-10.

Figure 6:
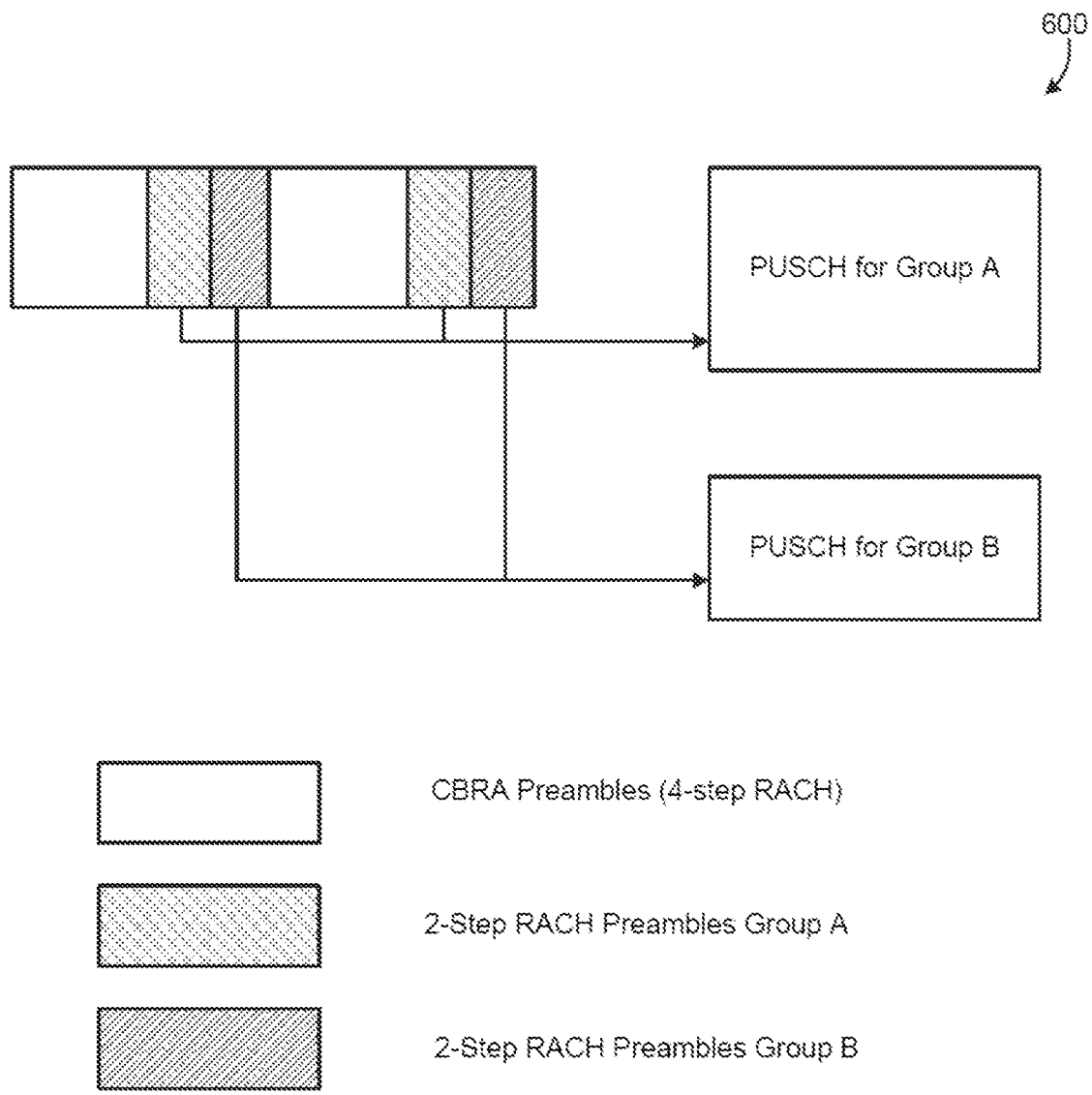
FIG. 6 is a diagram illustrating a two-step RACH with multiple PUSCH configurations with each configuration having its own preamble space according to an example implementation.

FIG. 6 is a diagram illustrating a two-step RACH 600 with multiple PUSCH configurations according to an example implementation. As shown in FIG. 6, the PRACH preambles are partitioned into different groups according to the msgA size. These preambles may have a direct mapping to a PUSCH block with an adequate number of resources. The preambles of the different groups can be in the same RO, or in different ROs. FIG. 6 shows a two-step RACH 600 with two configurations, two-step RACH PUSCH resource group A and two-step RACH PUSCH resource group B. In this example implementation, the preambles of the two-step RACH share the same PRACH occasion with four-step CBRA preambles. Each two-step RACH PUSCH resource group configuration is an array of two-step RACH PUSCH resource units (as shown in FIG. 4) with a different amount of resources.

In some implementations, the more often occurring triggers would have a reduced contention space, i.e. they would have a higher level of collisions.

Figure 7:
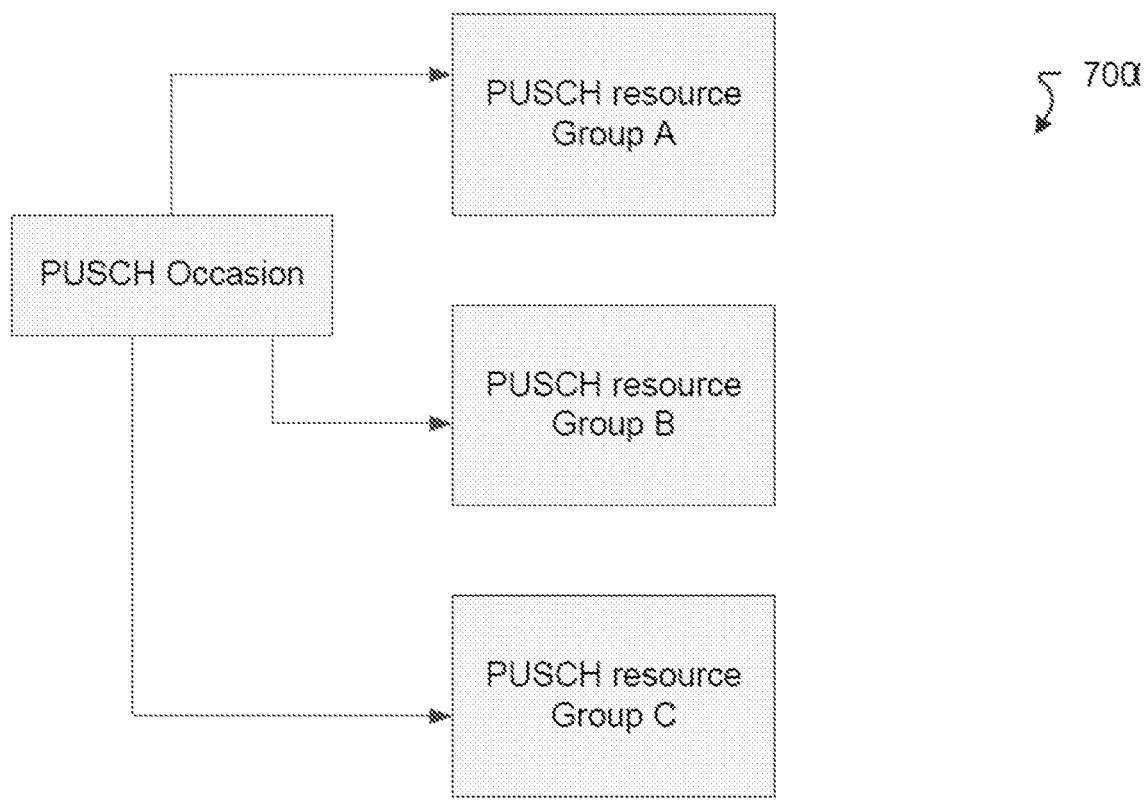
FIG. 7 is a diagram illustrating a two-step RACH with common preamble set and different PUSCH configurations according to an example implementation.

FIG. 7 is a diagram illustrating a two-step RACH 700 with common preamble set and different PUSCH configurations according to an example implementation. As shown in FIG. 7, the PRACH preambles are not partitioned. Nevertheless, after selecting a preamble, the UE selects a two-step RACH PUSCH resource unit with an adequate amount of resources from the pool of available two-step RACH PUSCH resource groups. In some implementations, each preamble is associated with multiple two-step RACH PUSCH resource units, in different groups, and each two-step PUSCH resource unit has a different resource allocation size. The UE selects the two-step PUSCH resource unit based on the amount of resources it needs. The gNB tries different hypotheses to determine which PUSCH resource the UE has sent.

FIG. 7 shows an example with a PRACH occasion that is not partitioned. Each preamble index in the PRACH occasion is associated with a two-step RACH PUSCH resource unit in each of the three two-step RACH PUSCH groups shown in FIG. 7. Each PUSCH resource group is similar to the MsgA data part of FIG. 4.

In the approach illustrated in FIG. 7, there is a more complex decoding as there would not be a direct mapping between PRACH preamble and PUSCH resource. This approach increases the probability of collision for the same PUSCH resource usage and/or increases the PUSCH resource usage.

Another approach involves having a single PUSCH resource allocation size. Smaller payloads are then padded or rate-matched to fit within a single PUSCH resource allocation size.

Yet another approach involves performing a resource partitioning by creating a set of "data carrying candidates", as shown in FIG. 5. In some implementations, the configuration will divide the resources into clusters of resources that allows for the UE to transmit the uplink data (PUSCH) for the random access message payload. This approach is discussed in detail with regard to FIGS. 8A and 8B.

Figure 8A:
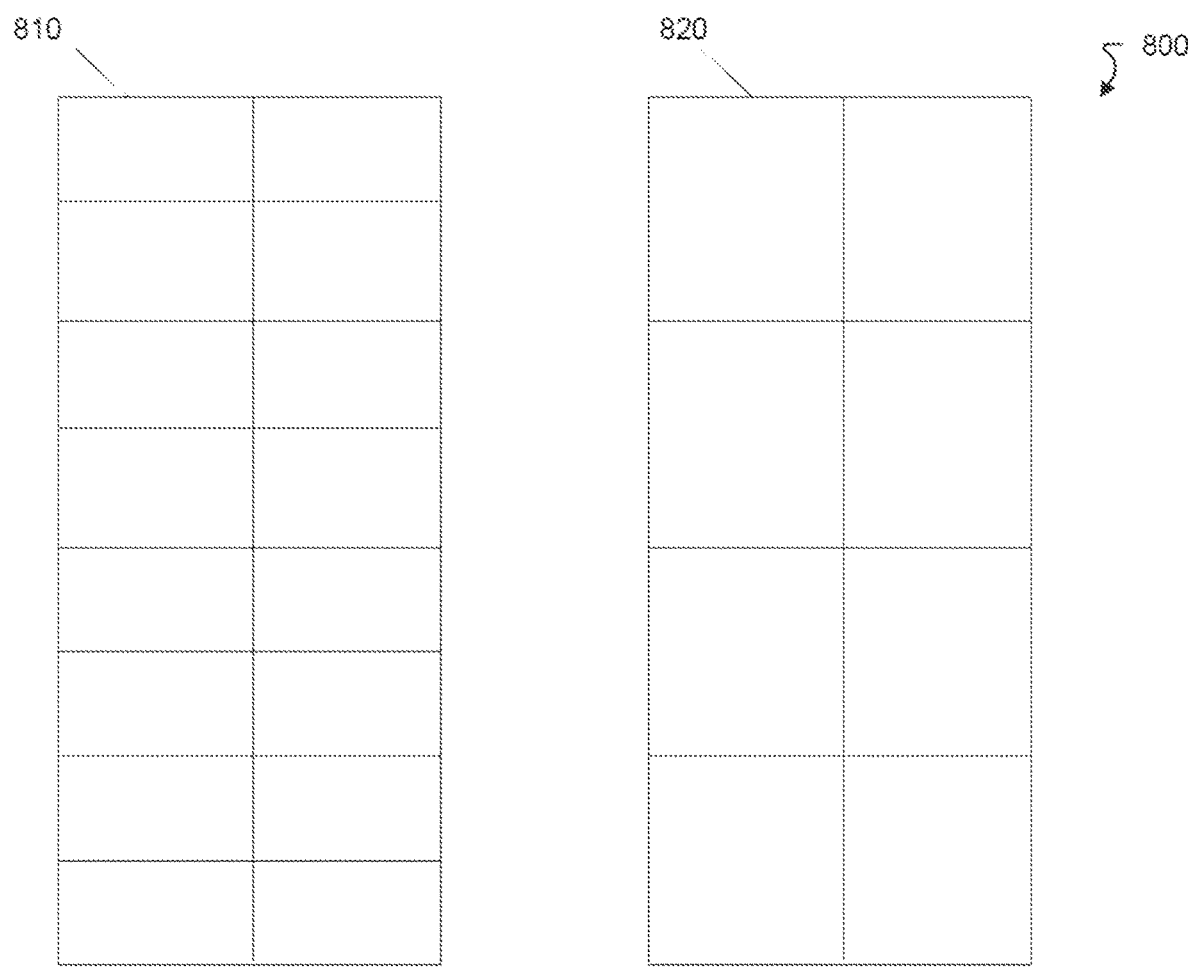
FIG. 8A is a diagram illustrating orthogonal resources for different payload sizes of MsgA according to an example implementation.

FIG. 8A is a diagram illustrating orthogonal resources 800 for different payload sizes of MsgA according to an example implementation. FIG. 8A shows that the resources are divided into two sets 810 and 820, each set being able to carry two different payload sizes. As shown in the FIG. 8A, the first X messages are pre-assigned to the smaller payloads, while the larger payloads (assuming up to Y messages) are reserved some other physical resources. By knowing the physical resources assigned to the message, as well as the amount of messages for X and Y (and payload size difference or ratio between X and Y), it is possible to generate a proper mapping between the payload sizes and the resources. An example of this approach is discussed with regard to FIG. 8B.

Figure 8B:
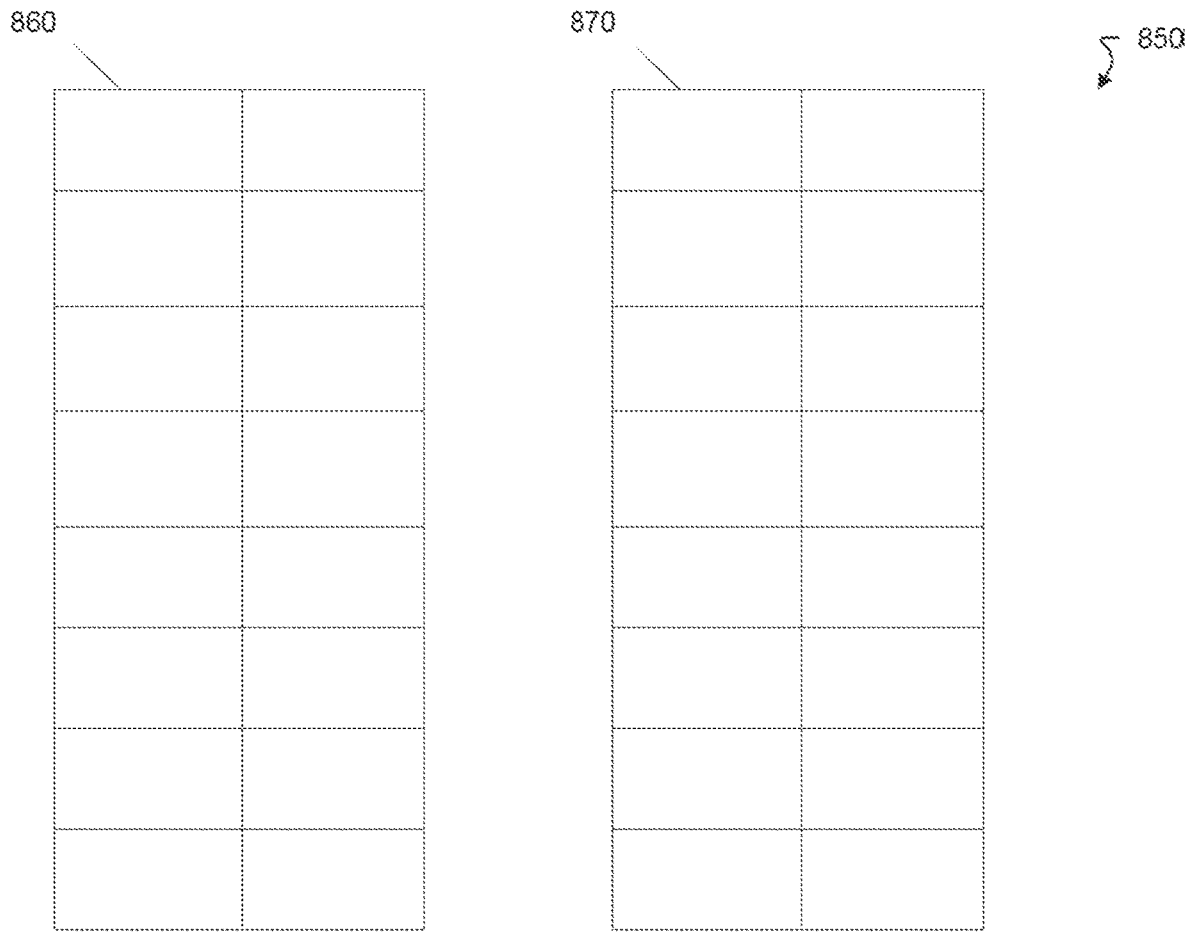
FIG. 8B is a diagram illustrating overlaid resources for different payload sizes of MsgA according to an example implementation.

FIG. 8B is a diagram illustrating overlaid resources 860 and 870 for different payload sizes of MsgA according to an example implementation. In FIG. 8B, the UE is allowed to create new "virtual" resources in the physical resources normally reserved for the larger payloads to carry messages with low payload. Allowance of using such resources on a temporary basis could potentially be triggered by network signaling via the RMSI (SIB1) in step 0.

In some implementations, the data carrying candidates are organized in an array of basic two-step RACH PUSCH resource units as shown in FIG. 8B. The basic unit is the smallest resource allocation size of MsgA data. When transmitting the data part of MsgA, the UE allocates one or more basic units depending on the configuration of MsgA and the amount of resources needed to transmit the MsgA payload. The preamble index is associated with the selected PUSCH resource. There are two alternatives in this scenario, discussed in further detail with regard to FIGS. 9 and 10, respectively.

Figure 9:
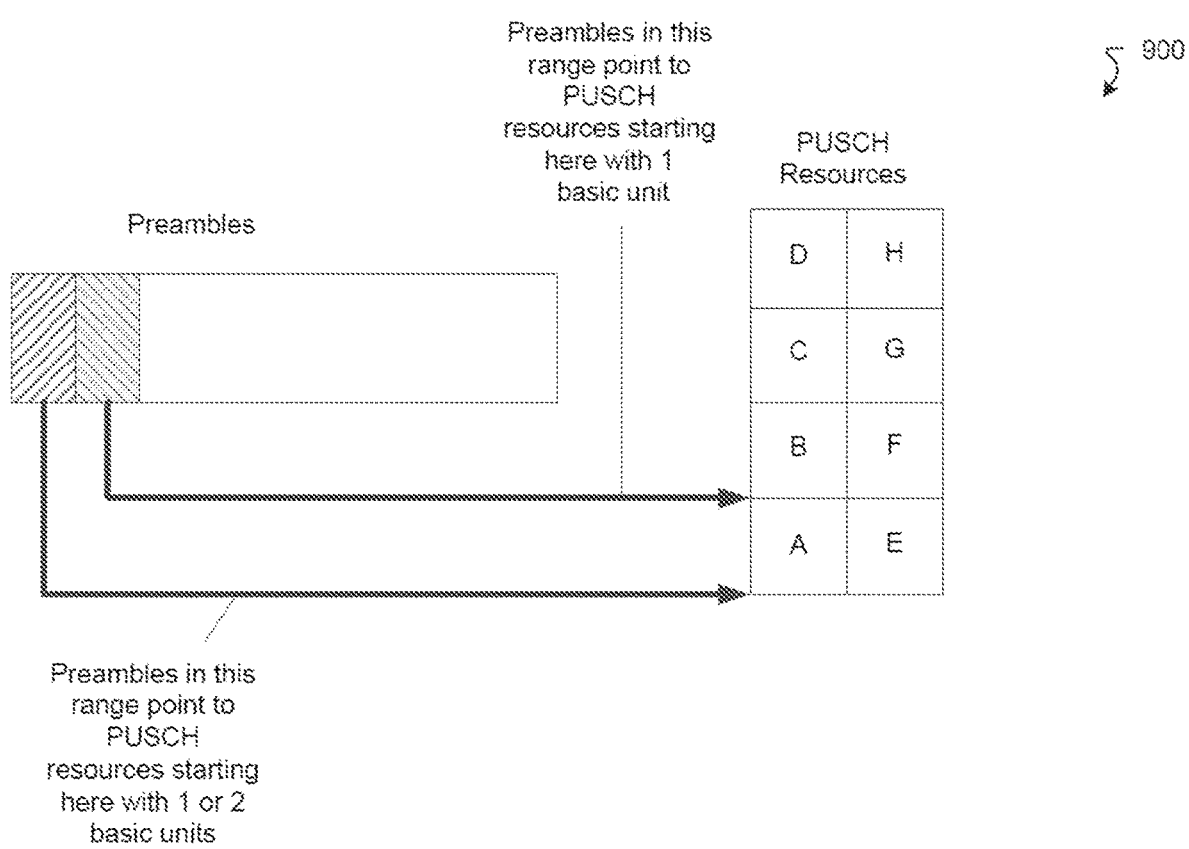
FIG. 9 is a diagram illustrating a two-step RACH PUSCH resource group allocation in basic two-step RACH PUSCH resource units with preamble indicating PUSCH starting location and size according to an example implementation.

FIG. 9 is a diagram illustrating a two-step RACH PUSCH resource group 900 in basic two-step RACH PUSCH resource units with preamble indicating PUSCH starting location and size according to an example implementation. The size determines the number of basic two-step RACH PUSCH units to use when transmitting the data part of MsgA. That is, the preamble index indicates the starting position (in time and frequency) of the PUSCH resource as well as the PUSCH resource allocation size (in number of basic units). FIG. 9 shows an example where the PUSCH resource can have a size of one or two basic units, and preamble index indicates the PUSCH resource starting position in time and frequency, as well as the PUSCH resource size. The preamble index can also indicate the DMRS port of the PUSCH resource. This alternative reduces the gNB receiver complexity, as it avoids decoding multiple hypotheses.

As an example, consider eight basic two-step RACH PUSCH resource units for MsgA as shown in FIG. 8. These are denoted by A, B, C, D, E, F, G, H. In this example, the network configures the following possible PUSCH allocations eight single basic resource allocation: A, B, C, D, E, F, G, H, and 4 double resource allocation: AB, CD, EF, GH. In total, there are twelve possible allocations that can be signalled by the preamble. The preamble space, in this example is divided into twelve sets. When a preamble is selected from a set, it points to the PUSCH resource corresponding to that set.

Figure 10:
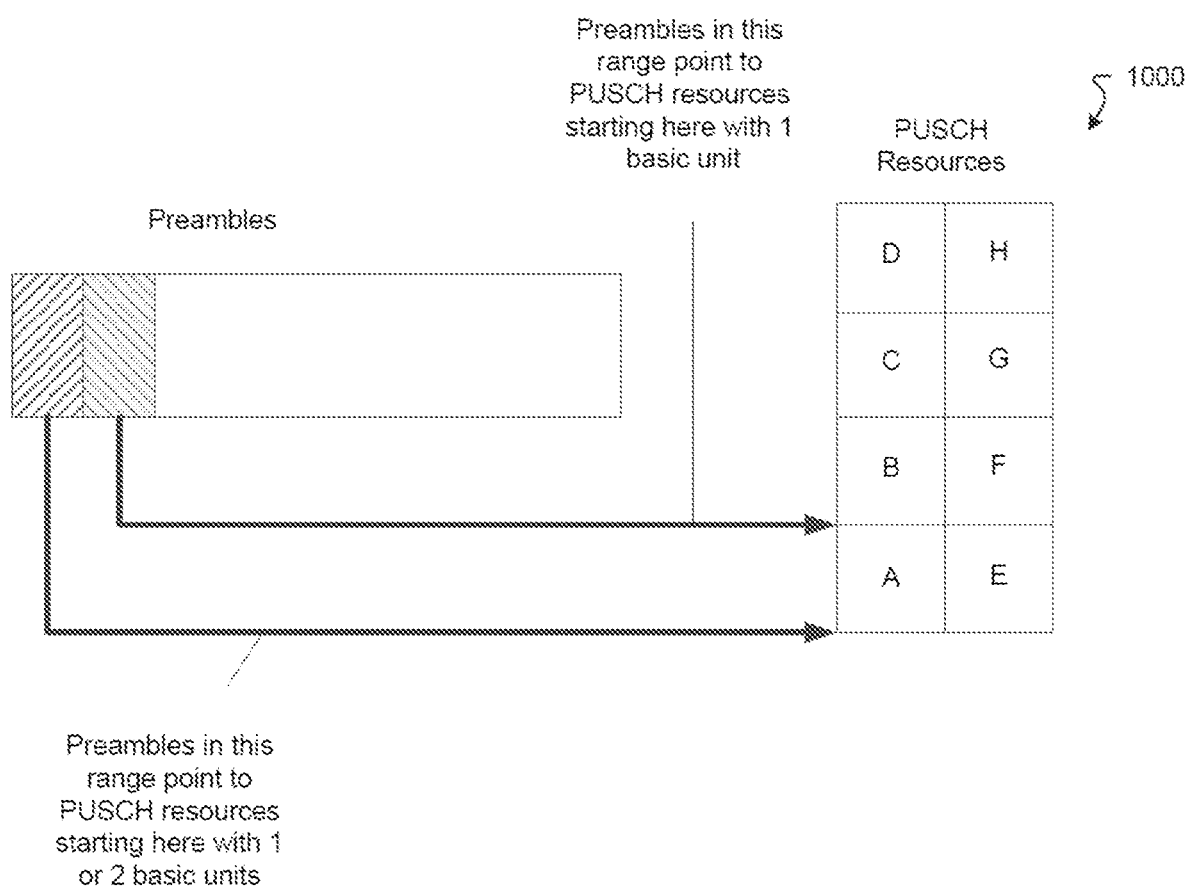
FIG. 10 is a diagram illustrating a two-step RACH PUSCH resource group allocation in basic two-step RACH PUSCH resource units with preamble indicating PUSCH starting location according to an example implementation.

FIG. 10 is a diagram illustrating PUSCH resource allocation in basic two-step RACH PUSCH resource units with preamble indicating PUSCH starting location according to an example implementation. That is, the preamble index indicates the starting position (in time and frequency). The preamble index can also indicate the DMRS port of the PUSCH resource. The UE selects PUSCH resource size based on the amount of data and MCS it needs to transmit. The size determines the number of basic two-step RACH PUSCH units to use when transmitting the data part of MsgA according to the sizes allowed by configuration. The gNB tries multiple decoding hypotheses to find the PUSCH resource size sent by the UE.

As an example, consider eight basic two-step RACH PUSCH resource units for MsgA as shown in FIG. 10. These are denoted by A, B, C, D, E, F, G, H. In this example, the network configures the following possible PUSCH allocations eight single basic resource allocation: A, B, C, D, E, F, G, H, and 4 double resource allocation: AB, CD, EF, GH. In total, there are twelve possible allocations, however, there are only eight possible starting positions. The preamble space, in this example is divided into eight sets corresponding to the starting positions. When a preamble is selected from a set, it points to the PUSCH resource starting position corresponding to that set. If a preamble points to a starting position with two possible resource allocation sizes (e.g., A and AB), the network decodes multiple hypotheses to determine the PUSCH resource allocation the UE used to transmit the data part of MsgA.

Figure 11:
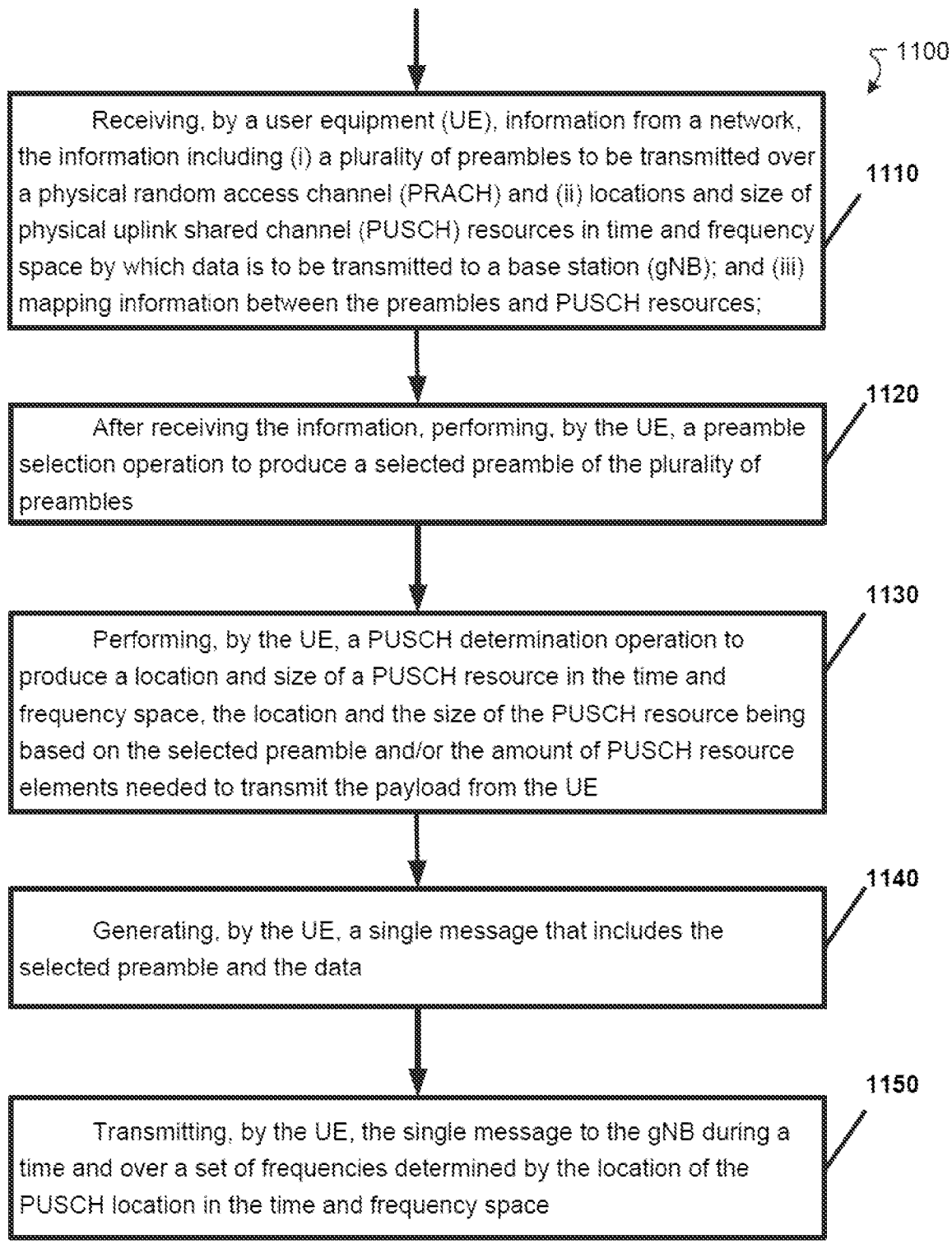
FIG. 11 is a flow chart illustrating a method of performing a two-step RACH procedure according to an example implementation.

Example 1: FIG. 11 is a flow chart illustrating an example method 1100 of performing the improved techniques. Operation 1110 includes receiving, by a user equipment (UE), information from a network, the information including (i) a plurality of preambles to be transmitted over a physical random access channel (PRACH) and (ii) locations and size and DMRS ports of physical uplink shared channel (PUSCH) resources in time and frequency space by which data is to be transmitted to a base station (gNB); and (iii) mapping information between the preambles and PUSCH resources. Operation 1120 includes, after receiving the information, performing, by the UE, a preamble selection operation to produce a selected preamble of the plurality of preambles. Operation 1130 includes performing, by the UE, a PUSCH determination operation to produce a location and size of a PUSCH resource in the time and frequency space and the DMRS port of the PUSCH resource, the location and the size of the PUSCH resource and the DMRS port of the PUSCH resource being based on the selected preamble and/or the amount of PUSCH resource elements needed to transmit the payload from the UE. Operation 1140 includes generating, by the UE, a single message that includes the selected preamble and the data. Operation 1150 includes transmitting, by the UE, the single message to the gNB during a time and over a set of frequencies determined by the location of the PUSCH resource in the time and frequency space.

Example 2: According to an example implementation, a method includes receiving, by a user equipment (UE), information from a network, the information including (i) a plurality of preambles to be transmitted over a physical random access channel (PRACH) and (ii) locations and size and DMRS ports of physical uplink shared channel (PUSCH) resources in time and frequency space by which data is to be transmitted to a base station (gNB); and (iii) mapping information between the preambles and PUSCH resources; after receiving the information, performing, by the UE, a preamble selection operation to produce a selected preamble of the plurality of preambles; and performing, by the UE, a PUSCH determination operation to produce a location and size of a PUSCH resource in the time and frequency space and the DMRS port of the PUSCH resource, the location and the size of the PUSCH resource and the DMRS port of the PUSCH resource being based on the selected preamble and/or the amount of PUSCH resource elements needed to transmit the payload from the UE.

Example 3: According to an example implementation of Example 2, further including generating, by the UE, a single message that includes the selected preamble and the data.

Example 4: According to an example implementation of any of Examples 2-3, further including transmitting, by the UE, the single message to the gNB during a time and over a set of frequencies determined by the location of the PUSCH resource in the time and frequency space.

Example 5: According to an example implementation of Example 2, wherein each of the plurality of preambles is represented by a respective preamble index, wherein each of the locations of the PUSCH resources is represented by a time index and a frequency index, the time index indicating the time, the frequency index indicating a frequency of the set of frequencies, and wherein performing the PUSCH selection operation includes finding a physical resource block (PRB) of a plurality of PRBs having a frequency index and an orthogonal frequency division multiplex (OFDM) symbol having a time index produced by a mapping operation based on the preamble index.

Example 6: According to an example implementation of Example 5, wherein finding the PRB having the time index and frequency index produced by the mapping operation includes generating a preamble multiplier, the preamble multiplier being based on a ratio of a number of preambles of the plurality of preambles to a number of PUSCH resources.

Example 7: According to an example implementation of Example 6, wherein finding the PRB having the time index and frequency index produced by the mapping operation further includes generating a ratio of the preamble index to the preamble multiplier to produce a coefficient, the time index and the frequency index being based on a ratio of the coefficient to a number of PUSCH resources in frequency space.

Example 8: According to an example implementation of any of Examples 2-7, wherein each of the PUSCH resources has a set of demodulation reference signal (DMRS) ports, and wherein the method further comprises locating, within the found PRB(s) and OFDM symbol(s), a DMRS port corresponding to the preamble index.

Example 9: According to an example implementation of Example 8, wherein locating the DMRS port within the found PRB(s) and OFDM symbol(s) includes generating a preamble ratio, the preamble ratio being a ratio of a number of preambles corresponding to the found PRB(s) and OFDM symbol(s) and a number of DMRS ports of the found PRB.

Example 10: According to an example implementation of Example 9, wherein locating the DMRS port within the found PRB(s) and OFDM symbol(s) further includes generating a ratio of a local preamble index to the preamble ratio to produce a DMRS port index, the local preamble index indicating the preamble within the found PRB(s) and OFDM symbol(s).

Example 11: According to an example implementation of any of Examples 2-10, wherein data defining the preamble and the PUSCH resources are arranged on a resource grid, the resource grid having (i) a plurality of slots corresponding to the time and (ii) physical resource blocks (PRBs) associated with a respective subcarrier of a respective plurality of subcarriers corresponding to each of the plurality of slots.

Example 12: According to an example implementation of Example 11, wherein the preamble is arranged in a first slot of the resource grid and the PUSCH resources are arranged on a second slot of the resource grid, the first slot and the second slot being adjacent.

Example 13: According to an example implementation of Examples 11 or 12, wherein the subcarrier spacings of the plurality of subcarriers in the first slot are the same as the subcarrier spacings of the plurality of frequency bands in the second slot.

Example 14: According to an example implementation of any of Examples 11-13, wherein the preamble and the PUSCH resources are arranged on the same slot of the resource grid.

Example 15: According to an example implementation of any of Examples 2-14, wherein each of the plurality of preambles is associated with a respective group of a plurality of groups based on a size of a payload associated with the data to be transmitted with that preamble in the single message.

Example 16: According to an example implementation of Example 15, wherein each of the plurality of preambles associated with a group of the plurality of groups belong to the same physical random access (PRACH) occurrence.

Example 17: According to an example implementation of Examples 15 or 16, wherein each of the plurality of preambles is signaled as a contention-free preamble.

Example 18: According to an example implementation of any of Examples 2-17, wherein each of the PUSCH resources has a respective payload size, and wherein performing the PUSCH selection operation includes selecting a PUSCH resource according to its payload size.

Example 19: According to an example implementation of any of Examples 2-18, wherein each of the PUSCH resources has the same payload size.

Example 20: According to an example implementation of Example 19, wherein the size of the payload associated with the data is larger than the payload size of each of the PUSCH resources, and wherein performing the PUSCH selection operation includes selecting multiple PUSCH resources by which the data is to be transmitted to the gNB.

Example 21: According to an example implementation of Examples 19 or 20, wherein the preamble indicates a starting position in the time and frequency space of the selected PUSCH resource.

Example 22: According to an example implementation of Example 21, wherein the preamble further indicates the payload size of the selected PUSCH resource.

Example 23: According to an example implementation of any of Examples 2-22, wherein the method further comprises, after transmitting the single message to the gNB, receiving, from the gNB, a message indicating that the data was not successfully decoded and that a four-step RACH procedure is to be used to transmit the data to the gNB.

Example 24: An apparatus comprising means for performing a method of any of Examples 1-23.

Example 25: A computer program product including a non-transitory computer-readable storage medium and storing executable code that, when executed by at least one data processing apparatus, is configured to cause the at least one data processing apparatus to perform a method of any of Examples 1-23.

Further example implementations and/or example details will now be provided.

LIST OF EXAMPLE ABBREVIATIONS

Figure 12:
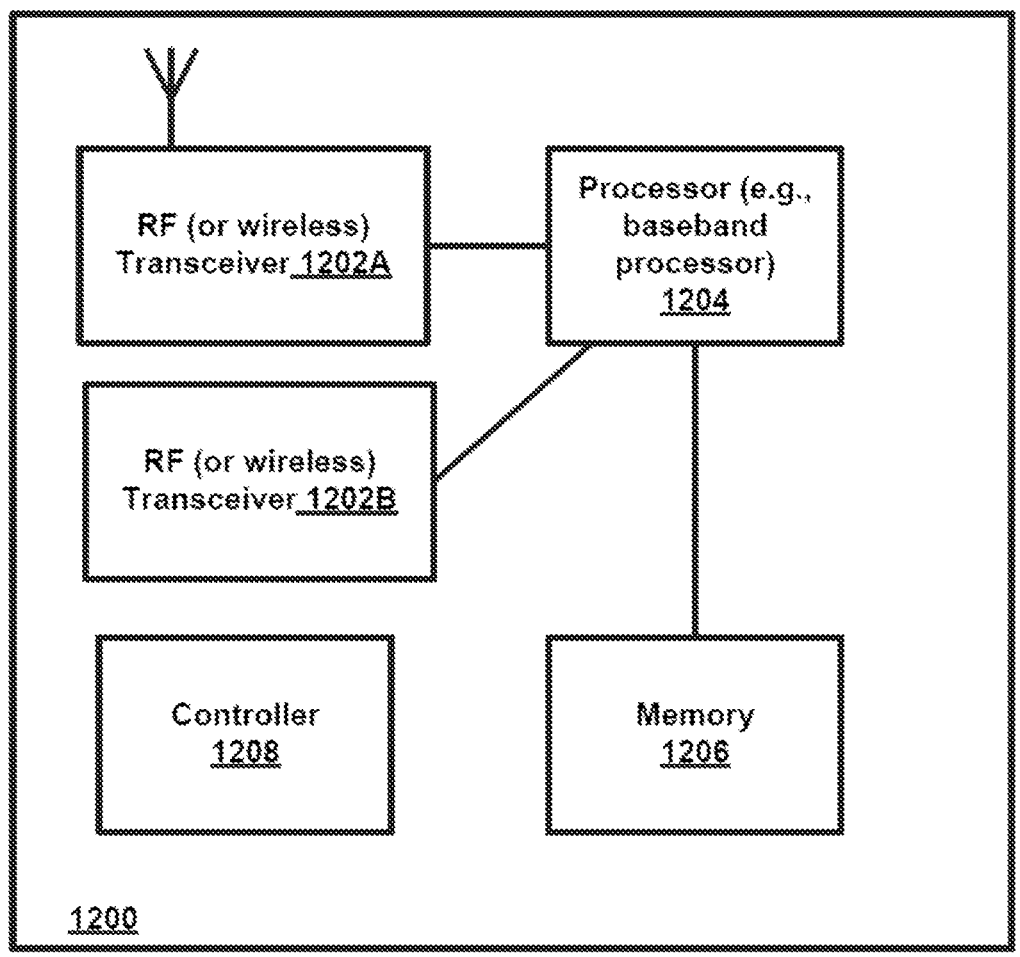
FIG. 12 is a block diagram of a node or wireless station (e.g., base station/access point, relay node, or mobile station/user device) according to an example implementation.

3GPP: third generation partnership project
4G: fourth generation of mobile telecommunication technology
5G: fifth generation of mobile telecommunication technology
5GMM: 5GS mobility management
5GS: 5G system
5GSM: 5GS session management
ACB: access class barring
AMF: access and mobility management function
CSFB: circuit switched fallback
DM: device management
DN: data network
DNN: data network name EHPLMN: equivalent HPLMN
eMBB: enhanced mobile broadband
eNB: evolved Node B
EPS: evolved packet system
gNB: next generation Node B (uncertain)
HPLMN home PLMN
IMS: IP multimedia subsystem
IoT: internet of things
IP: internet protocol
MME: mobility management entity
MMTel: IMS multimedia telephony service
NAS: non-access stratum
NGAP: next generation application protocol
NSSAI: network slice selection assistance information
OAM: operations, administration, and management
OMA: open mobile alliance
OS: operating system
PCF: policy control function
PDU: protocol data unit
PLMN public land mobile network
RAN: radio access network
RRC: radio resource control
S-NSSAI: single NSSAI
SD: slice differentiator
SMS: short message service
SMSoNAS: SMS over NAS
SMSoIP: SMS over IP
SSAC: service specific access control
SST: slice/service type
UDM: user data management
UE: user equipment
UPF: user plane function
URLLC: ultra-reliable and low latency communication
VPLMN: visited PLMN FIG. 12 is a block diagram of a wireless station (e.g., AP, BS, eNB, UE or user device) 1200 according to an example implementation. The wireless station 1200 may include, for example, one or two RF (radio frequency) or wireless transceivers 1202A, 1202B, where each wireless transceiver includes a transmitter to transmit signals and a receiver to receive signals. The wireless station also includes a processor or control unit/entity (controller) 1204 to execute instructions or software and control transmission and receptions of signals, and a memory 1206 to store data and/or instructions.

Processor 1204 may also make decisions or determinations, generate frames, packets or messages for transmission, decode received frames or messages for further processing, and other tasks or functions described herein. Processor 1204, which may be a baseband processor, for example, may generate messages, packets, frames or other signals for transmission via wireless transceiver 1202 (1202A or 1202B). Processor 904 may control transmission of signals or messages over a wireless network, and may control the reception of signals or messages, etc., via a wireless network (e.g., after being down-converted by wireless transceiver 1202, for example). Processor 1204 may be programmable and capable of executing software or other instructions stored in memory or on other computer media to perform the various tasks and functions described above, such as one or more of the tasks or methods described above. Processor 1204 may be (or may include), for example, hardware, programmable logic, a programmable processor that executes software or firmware, and/or any combination of these. Using other terminology, processor 1204 and transceiver 1202 together may be considered as a wireless transmitter/receiver system, for example.

In addition, referring to FIG. 12, a controller (or processor) 1208 may execute software and instructions, and may provide overall control for the station 1200, and may provide control for other systems not shown in FIG. 12, such as controlling input/output devices (e.g., display, keypad, and/or may execute software for one or more applications that may be provided on wireless station 1200, such as, for example, an email program, audio/video applications, a word processor, a Voice over IP application, or other application or software.

In addition, a storage medium may be provided that includes stored instructions, which when executed by a controller or processor may result in the processor 1204, or other controller or processor, performing one or more of the functions or tasks described above.

According to another example implementation, RF or wireless transceiver(s) 1202A/1202B may receive signals or data and/or transmit or send signals or data. Processor 1204 (and possibly transceivers 1202A/1202B) may control the RF or wireless transceiver 1202A or 1202B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

The invention claimed is:

1. A method, comprising:
receiving, by a user equipment, information from a network, the information including (i) a plurality of preambles to be transmitted over a physical random access channel and (ii) locations and size and demodulation reference signal ports of physical uplink shared channel resources in time and frequency space by which data is to be transmitted to a base station; and (iii) mapping information between the preambles and physical uplink shared channel resources;
after receiving the information, performing, by the user equipment, a preamble selection operation to produce a selected preamble of the plurality of preambles;
performing, by the user equipment, a physical uplink shared channel determination operation to produce a location and size of a physical uplink shared channel resource in the time and frequency space and a demodulation reference signal port of the physical uplink shared channel resource, the location and the size of the physical uplink shared channel resource and demodulation reference signal port of the physical uplink shared channel resource being based on the selected preamble;
wherein the method further comprises generating a single message that includes the selected preamble and the data and transmitting the single message to the base station during a time and over a set of frequencies determined by the location of the physical uplink shared channel resource in the time and frequency space, wherein each of the plurality of preambles is represented by a respective preamble index, wherein each of the locations of the physical uplink shared channel resources is represented by a time index and a frequency index, the time index indicating the time, the frequency index indicating a frequency of the set of frequencies, wherein performing the physical uplink shared channel determination operation includes finding a physical resource block having a frequency index and an orthogonal frequency division multiplex symbol having a time index produced by a mapping operation based on the preamble index, wherein each of the physical uplink shared channel resources has a set of demodulation reference signal ports, wherein the method further comprises locating, within the found physical resource block and orthogonal frequency division multiplex symbol, a demodulation reference signal port corresponding to the preamble index, and wherein locating the demodulation reference signal port within the found physical resource block and orthogonal frequency division multiplex symbol includes generating a preamble ratio, the preamble ratio being a ratio of a number of preambles corresponding to the found physical resource block and orthogonal frequency division multiplex symbol and a number of demodulation reference signal ports of the found physical resource block.

2. An apparatus, comprising: at least one processor; and at least one memory including computer program code; the at least one memory and the computer program code configured to, with the at least one processor, cause the apparatus at least to:

receive information from a network, the information including (i) a plurality of preambles to be transmitted over a physical random access channel and (ii) locations and size and demodulation reference signal ports of physical uplink shared channel resources in time and frequency space by which data is to be transmitted to a base station; and (iii) mapping information between the preambles and physical uplink shared channel resources;

after receiving the information, perform a preamble selection operation to produce a selected preamble of the plurality of preambles;

perform a physical uplink shared channel determination operation to produce a location and size of a physical uplink shared channel resource in the time and frequency space and a demodulation reference signal port of the physical uplink shared channel resource, the location and size of the physical uplink shared channel resource and the demodulation reference signal port of the physical uplink shared channel resource being based on the selected preamble;

wherein the apparatus is further caused to generate a single message that includes the selected preamble and the data and transmit the single message to the base station during a time and over a set of frequencies determined by the location of the physical uplink shared channel resource in the time and frequency space, wherein each of the plurality of preambles is represented by a respective preamble index, wherein each of the locations of the physical uplink shared channel resources is represented by a time index and a frequency index, the time index indicating the time, the frequency index indicating a frequency of the set of frequencies, wherein the apparatus caused to perform the physical uplink shared channel determination operation is further caused to find a physical resource block having a frequency index and an orthogonal frequency division multiplex symbol having a time index produced by a mapping operation based on the preamble index, wherein each of the physical uplink shared channel resources has a set of demodulation reference signal ports, wherein the apparatus is further caused to locate, within the found physical resource block and orthogonal frequency division multiplex symbol, a demodulation reference signal port corresponding to the preamble index, and wherein the apparatus caused to locate the demodulation reference signal port within the found physical resource block and orthogonal frequency division multiplex symbol is further caused to generate a preamble ratio, the preamble ratio being a ratio of a number of preambles corresponding to the found physical resource block and orthogonal frequency division multiplex symbol and a number of demodulation reference signal ports of the found physical resource block.

3. The apparatus as in claim 2, wherein the apparatus caused to find the physical resource blocks having the time index and frequency index produced by the mapping operation is further caused to generate a preamble multiplier, the preamble multiplier being based on a ratio of a number of preambles of the plurality of preambles to a number of physical uplink shared channel resources.

4. The apparatus as in claim 3, wherein the apparatus caused to find the physical resource blocks having the time index and frequency index produced by the mapping operation is further caused to generate a ratio of the preamble index to the preamble multiplier to produce a coefficient, the time index and the frequency index being based on a ratio of the coefficient to a number of physical uplink shared channel resources in the frequency space.

5. The apparatus as in claim 2, wherein the apparatus caused to locate the demodulation reference signal port within the found physical resource blocks and orthogonal frequency division multiplex symbols is further caused to generate a ratio of a local preamble index to the preamble ratio to produce a demodulation reference signal port index, the local preamble index indicating the preamble within the found physical resource blocks and orthogonal frequency division multiplex symbol.

6. The apparatus as in claim 2, wherein data defining the preamble and the physical uplink shared channel resources are arranged on a resource grid, the resource grid having (i) a plurality of slots corresponding to the time and (ii) physical resource blocks associated with respective subcarriers of a respective plurality of subcarriers corresponding to each of the plurality of slots.

7. The apparatus as in claim 6, wherein the preamble is arranged in a first slot of the resource grid and the physical uplink shared channel resources are arranged on a second slot of the resource grid, the first slot and the second slot being adjacent.

8. The apparatus as in claim 7, wherein the subcarrier spacings of the plurality of subcarriers in the first slot are the same as the subcarrier spacings of the plurality of subcarriers in the second slot.

9. The apparatus as in claim 6, wherein the preamble and the physical uplink shared channel resources are arranged on the same slot of the resource grid.

10. The apparatus as in claim 2, wherein each of the plurality of preambles is associated with a respective group of a plurality of groups based on a size of a payload associated with the data to be transmitted with that preamble in the single message.

11. The apparatus as in claim 10, wherein each of the plurality of preambles associated with a group of the plurality of groups belong to the same physical random access occurrence.

12. The apparatus as in claim 10, wherein each of the plurality of preambles is signaled as a contention-free preamble.

13. The apparatus as in claim 2, wherein each of the physical uplink shared channel resources has a respective payload size, and
wherein the apparatus caused to perform the physical uplink shared channel selection operation is further caused to select a physical uplink shared channel resource according to its payload size.

14. The apparatus as in claim 2, wherein each of the physical uplink shared channel resources has the same payload size.

15. A computer program product including a non-transitory computer-readable storage medium and storing executable code that, when executed by at least one data processing apparatus, is configured to cause the at least one data processing apparatus to:
receive, by a user equipment, information from a network, the information including (i) a plurality of preambles to be transmitted over a physical random access channel and (ii) locations and size and demodulation reference signal ports of physical uplink shared channel resources in time and frequency space by which data is to be transmitted to a base station; and (iii) mapping information between the preambles and physical uplink shared channel resources;
after receiving the information, perform, by the user equipment, a preamble selection operation to produce a selected preamble of the plurality of preambles;
perform, by the user equipment, a physical uplink shared channel determination operation to produce a location and size of a physical uplink shared channel resource in the time and frequency space and the demodulation reference signal port of the physical uplink shared channel resource, the location and the size of the physical uplink shared channel resource and demodulation reference signal port of the physical uplink shared channel resource being based on the selected preamble;
wherein the executable code is further configured to cause the at least one data processing apparatus to generate a single message that includes the selected preamble and the data and transmit the single message to the base station during a time and over a set of frequencies determined by the location of the physical uplink shared channel resource in the time and frequency space,
wherein each of the plurality of preambles is represented by a respective preamble index,
wherein each of the locations of the physical uplink shared channel resources is represented by a time index and a frequency index, the time index indicating the time, the frequency index indicating a frequency of the set of frequencies,
wherein the executable code configured to cause the at least one data processing apparatus to perform the physical uplink shared channel determination operation is further configured to cause the at least one data processing apparatus to find a physical resource block having a frequency index and an orthogonal frequency division multiplex symbol having a time index produced by a mapping operation based on the preamble index,
wherein each of the physical uplink shared channel resources has a set of demodulation reference signal ports,
wherein the executable code is further configured to cause the at least one data processing apparatus to locate, within the found physical resource block and orthogonal frequency division multiplex symbol, a demodulation reference signal port corresponding to the preamble index, and
wherein the executable code configured to cause the at least one data processing apparatus to locate the demodulation reference signal port within the found physical resource block and orthogonal frequency division multiplex symbol is further configured to cause the at least one data processing apparatus to generate a preamble ratio, the preamble ratio being a ratio of a number of preambles corresponding to the found physical resource block and orthogonal frequency division multiplex symbol and a number of demodulation reference signal ports of the found physical resource block.

\* \* \* \* \*